Aug. 2, 1927.
T. G. BROWN
1,637,435
ELECTRIC OVEN
Filed Feb. 25, 1926
2 Sheets-Sheet 1.
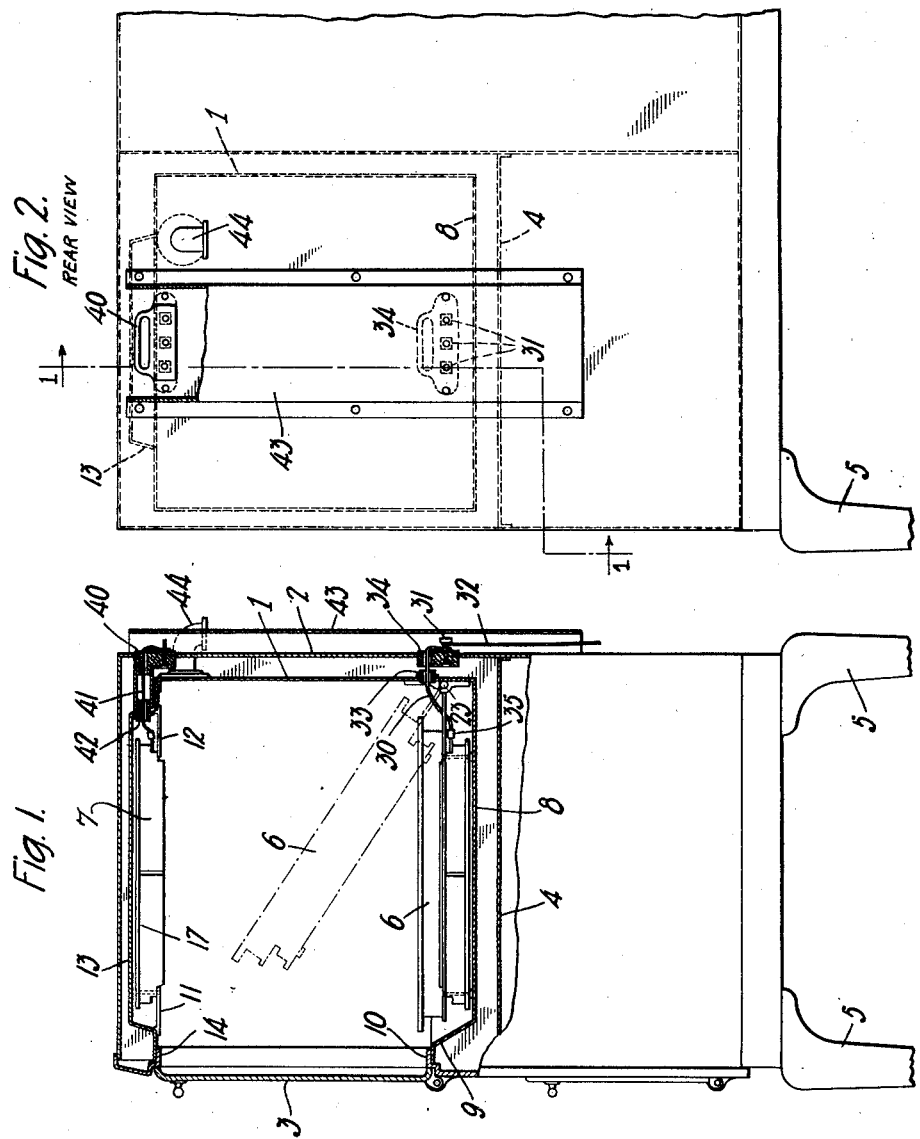
Inventor
T. G. Brown
by Pannrovich
his Atty Aug. 2, 1927.
T. G. BROWN
1,637,435
ELECTRIC OVEN
Filed Feb. 25, 1926 2 Sheets-Sheet 2
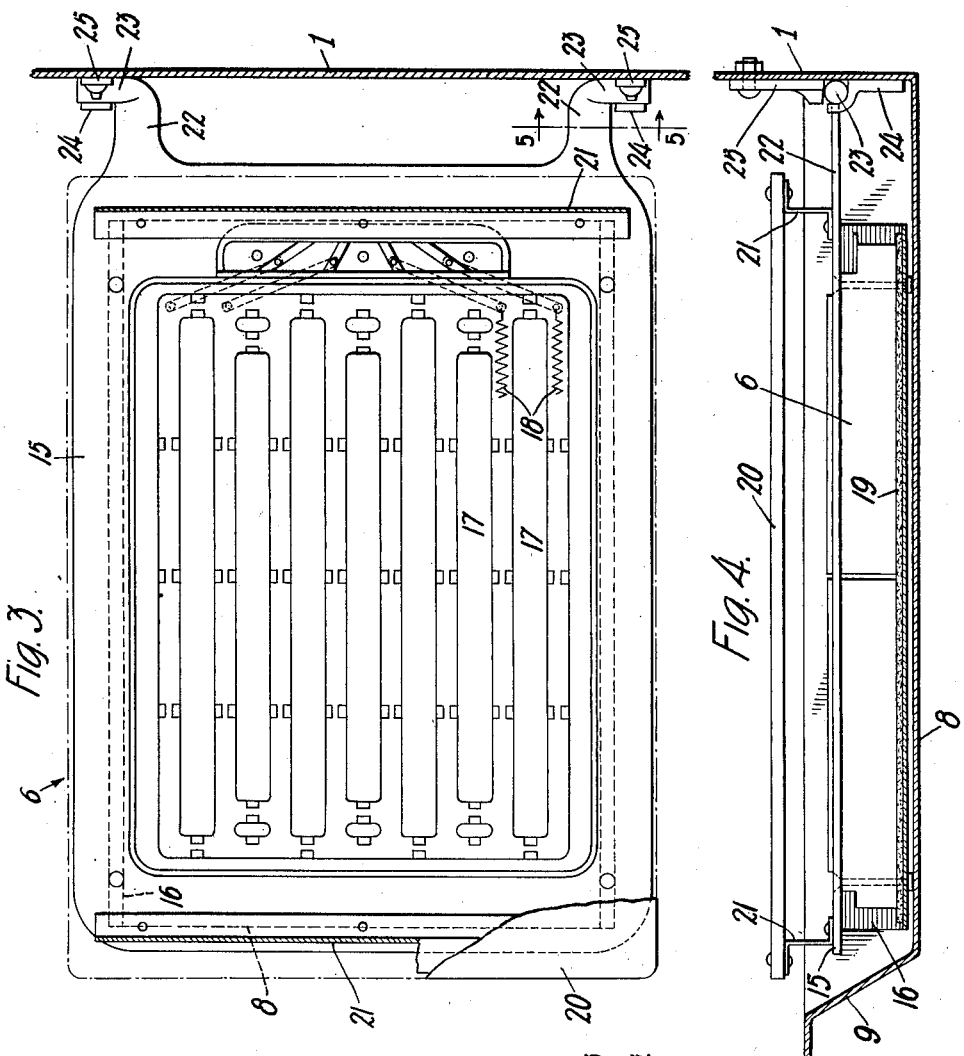
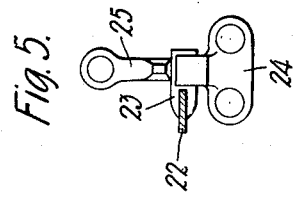
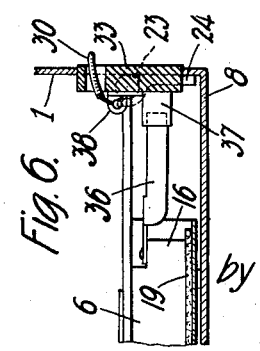
Inventor
T. G. Brown
by Pauwkolich
his Atty Patented Aug. 2, 1927.

1,637,435

UNITED STATES PATENT OFFICE.

THOMAS GIBB BROWN, OF ST. LAURENT DE MONTREAL, QUEBEC, CANADA, ASSIGNOR TO THE GURNEY FOUNDRY COMPANY, LIMITED, OF TORONTO, CANADA, A CORPORATION.

ELECTRIC OVEN.

Application filed February 25, 1926. Serial No. 90,446.

This invention relates to electric ovens, and more particularly to improvements in the mounting of and electric connections to heating elements of electric ovens.

It is the object of the present invention so to mount the heating element that the cleaning of the oven may be readily effected. With this object in view, the heating element resting on the bottom of the oven is hinged to the oven wall so that it may be lifted up at any time. The hinged mounting of the element is so provided that it does not interfere with the electrical connections to the element. In accordance with one of the features of the invention, a switch, preferably of the knife-blade type, is provided in said electric connection. The switch is so mounted that in the normal position of the element it closes the circuit leading thereto, but when the element is removed or rotated on its hinge, the switch interrupts the circuit.

These and other features of the invention will more clearly appear from the following detailed description of a preferred embodiment of the invention and the appended claims.

The drawings illustrate as much of an electric oven as is necessary for a clear understanding of the present invention. Fig. 1 is a side elevation, partly in section, of the oven; Fig. 2 a rear view; Fig. 3 a top plan view of the heating elements; Fig. 4 a vertical cross-section of a heatng element; Fig. 5 is a section along line 5—5 of Fig. 3 of the hinge on which the element is suspended; and Fig. 6 illustrates an alternative electrical connection with the heating element.

Referring now to the drawings, the oven is surrounded by an inner wall 1 and an outer wall 2. Access may be had to the oven through a drop hinged door 3. The oven proper is separated from a bottom heating compartment by a partition 4 and the whole structure is supported on legs such as 5.

The oven is heated by two electric heating elements 6 and 7 mounted in the oven top and bottom, respectively. The heating element 6 rests on a bottom extension 8 of the inner wall which, by means of an upturned lip 9, is secured to the oven front at 10. The top element 7 is held by means of frames 11 and 12 and suitable brackets (not shown) within a cavity formed by a top extension 13 of the inner wall 2. The top wall is fastened to a bracket 14 projecting from the oven front above the door 3.

The lower heating element 6 comprises a cast iron frame 15 which supports a steel pan 16. Porcelain bars 17 carrying the usual resistance wires 18 rest on an asbestos pad 19 placed on the bottom of pan 16. An element protecting plate 20 is mounted on top of frame 15 by means of brackets 21. Two arms 22 project horizontally from the side of frame 15. The ends of these arms are bent at right angles, as indicated at 23, and rest in trough-shaped brackets 24 mounted on the inner wall 1 of the oven. The whole lower element 6 may be tilted into the position indicated in dotted lines in Fig. 1 by rotating it on the pivot or hinge constituted by arm ends 23 and brackets 24. In order to limit the rotation of the element, a stop 25 is bolted to the inner wall 1 above bracket 24. By taking down the stops 25, the element 6 may be entirely removed from the oven.

The lower element 6 may thus be lifted up for cleaning the pan constituted by wall 8 without disturbing the electrical connections. As shown in Figs. 1–3, the heating element 6 is connected through insulated conductors such as 30 to a binding post 31 with which the current main 32 is also connected. The insulated conductor 30 passes through perforations in porcelain bushings 33 and 34 mounted, respectively, in the oven walls 1 and 2. The binding post 31 projects from the bushing 34.

Conductor 30 is long enough to permit the swinging movement of the heating element 6. However, repeated lifting of the element 6 may cause breakage of conductor 30. In order to obviate this and to simplify the connection of this heating element with the current mains, the arrangement illustrated in Fig. 6 may be provided. As shown in this modification the resistance wire of the element, instead of terminating in plugs such as 35 (see Fig. 1) with which the conductor 30 is connected, terminates in blades such as 36 projecting through the rear opening of pan 16. In the normal position of the heating element the blade 36 is held between parrallel switch blades 37 projecting from the bushing 33 which, in the present case, is somewhat elongated. The blades 36 and 37 constitute a knife-blade switch. The switch blades 37 are electrically connected with a lug 38, also projecting from the bushing 33, and with which a shortened conductor 30 is connected, said conductor being fastened at its other end to the binding post 31 (Fig. 1). With this arrangement connection with the current main 32 may be established by simply putting the element 6 in its place. When the element 6 is lifted up, the blade 36 rotates with it out of contact with the blades 37, interrupting thus the electrical connection with the resistance wires.

As illustrated in Fig. 2, the opening in the porcelain bushing 34 is wide enough to permit passage of a purality of conductors 30, a suitable number of binding posts 31 being mounted on the bushing for connection with the current mains. A porcelain bushing 40 is provided in the upper part of wall 2. This bushing protects and serves as a mounting for the binding posts of conductors like 41 leading to the upper heating element 7. The conductors 41 also project through an opening in procelain bushing 42 provided in the inner wall top 13. The terminal blocks constituted by bushings 40 and 34 are covered by a steel plate 43 mounted on the outer wall 2. The oven is ventilated at 44.

What I claim is:

1. In an electric oven having a wall, a heating element having a frame, two arms projecting from one side of said frame, trough-shaped brackets on said wall in which the ends of said arms rest, and removable stops on the oven wall above said brackets.

2. In an electric oven having a wall, a heating element, a hinged mounting for said element on said wall, and a knife-blade switch adjacent to said hinged mounting and controlling the connection between said element and the current main.

3. In an electric oven having a wall, a heat-element, a hinged mounting for said element on said wall, an electric connection between the current main and said element, and a switch actuated in response to the rotation of said element on said hinge for interrupting said connection.

4. In an electric oven having a bottom and a rear wall, a heating element resting on said bottom, a hinged mounting for said element on said rear wall, an electric connection between the current main and said element, and a knife-blade switch in said connection mounted on said rear wall and actuated in response to the rotation of said element.

In testimony whereof, I have signed my name to this specification, this 18 day of January, 1926.

THOMAS GIBB BROWN.